United States Patent [19]

Sakamoto et al.

[11] Patent Number: 5,119,004
[45] Date of Patent: Jun. 2, 1992

[54] REFERENCE-POINT RETURN METHOD

[75] Inventors: Keiji Sakamoto, Tokyo; Shigeyuki Ushiyama, Yamanashi; Mitsuyuki Taniguchi, Yamanashi; Hirofumi Kikuchi, Yamanashi, all of Japan

[73] Assignee: Fanuc Ltd., Minamitsuru, Japan

[21] Appl. No.: 474,753

[22] PCT Filed: Jul. 26, 1989

[86] PCT No.: PCT/JP89/00743
§ 371 Date: Mar. 23, 1990
§ 102(e) Date: Mar. 23, 1990

[87] PCT Pub. No.: WO90/01188
PCT Pub. Date: Feb. 8, 1990

[30] Foreign Application Priority Data

Jul. 28, 1988 [JP] Japan .................. 63-189263

[51] Int. Cl.⁵ .................. G05B 19/18
[52] U.S. Cl. .................. 318/569; 318/626; 318/571; 318/572; 318/594; 364/474.34; 250/237 G; 324/165
[58] Field of Search ........ 318/569, 626, 571, 572, 318/594; 364/474.34; 250/237 G; 324/165

[56] References Cited

U.S. PATENT DOCUMENTS

| 4,225,928 | 9/1980 | Ohkubo | 318/594 |
| 4,628,314 | 12/1986 | Morinaga et al. | 324/165 X |
| 4,782,275 | 11/1988 | Sakamoto et al. | 318/569 |
| 4,847,777 | 7/1989 | Konno | 364/474.34 |
| 4,956,553 | 9/1990 | Matsui | 250/237 G |

Primary Examiner—William M. Shoop, Jr.
Assistant Examiner—Saul M. Bergmann
Attorney, Agent, or Firm—Staas & Halsey

[57] ABSTRACT

The invention relates to a reference-point return method for returning a movable element of a machine to a reference point using solely a linear scale, without relying upon a limit switch. The method includes providing the linear scale (1) with a second scale portion (2) for stipulating a deceleration starting position and a reference-point position, in addition to first scale portion (3, 4) for generating two-phase signals for position detection, generating signals ($S_1$, $S_2$) indicative of the deceleration starting position (D) and reference-point position (O) from the second scale portion (2) of the linear scale, slowing a reference point return rapid-traverse velocity (Va) to a reference-point return rapid-traverse velocity (Vb) using the deceleration starting signal ($S_1$), and effecting return to the reference point by stopping movement in response to the reference-point signal ($S_2$).

4 Claims, 5 Drawing Sheets

_5,119,004_

REFERENCE-POINT RETURN METHOD

DESCRIPTION

1. Technical Field

This invention relates to a reference-point return method and, more particularly, to a reference-point return method for returning a machine tool table or the like to a predetermined reference point by an output signal from a linear scale.

2. Background of the Invention

A reference-point return method is available for moving a machine tool in the direction of a predetermined reference point, reducing the reference-point return velocity in response to generation of a deceleration signal, and stopping a movable element in response to an initial one-revolution signal, which is indicative of one revolution of a motor, following the generation of a signal indicating the proximity of the reference point. FIG. 5 is a view for describing such a reference-point return method. Here a movable element (table) TB of a machine is provided with a limit switch LS, and a stationary portion MC of the machine is provided with a reference-point return dog DG in the vicinity of the machine reference point. If the reference-point return mode is established when the limit switch LW resides in a working area AIII on the left side of the dog DG, the movable element TB of the machine is moved toward the reference point at a rapid-traverse velocity $V_H$. When the vicinity of the reference point is reached and the limit switch LS contacts the reference-point return dog DG at time $t_1$, a limit signal LSS makes a transition from "1" (high level) to "0" (low level), as shown in FIG. 5. The reference point return velocity is reduced in response to the negative-going transition (deceleration signal) of the limit signal LSS. At time $t_2$, the limit switch LS parts from the DG and the limit signal LSS reverts from "0" to "1". The traveling velocity at this time is $V_L$. When the limit signal LSS reverts from "0" to "1" (rises), the movable element TB of the machine subsequently moves toward the reference point at the velocity $V_L$ and stops in response to generation of an initial one-revolution signal ORS, which is indicative of one-revolution of a motor, following the occurrence of the positive-going transition (reference-point proximity signal) of the limit signal LSS. OTA in FIG. 5 represents an over-travel area, and first, second and third areas AI, AII and AIII represent an area on the over-travel side, a reference-point proximity area, and a working area, respectively.

In order to stipulate a predetermined position such as a deceleration-start position in the prior art, a mechanical switch such as the limit switch LS switched at the predetermined position is required. By relying solely upon the signal from this switch, the accuracy of the reference-point return operation is greatly influenced by the mounting precision and operating precision of the switch. Accordingly, the prior art is such that reference-point return control is performed by making joint use of this signal and the motor one-revolution signal generated by a linear scale or rotary encoder originally mounted on an NC machine tool.

With the prior art, however, the fact that the limit switch is used raises cost and entails a complicated mounting operation.

SUMMARY OF THE INVENTION

Accordingly, an object of the present invention is to provide a reference-point return method in which signals indicative of a deceleration starting position and a reference-point return position are generated solely by a linear scale, and without using a mechanical switch, to return a movable machine element to the reference point.

The present invention relates to a reference-point return method for returning a movable element of a machine to a reference point using solely a linear scale, without relying upon a limit switch. In the present invention, the arrangement is such that a linear scale generates signals indicative of a deceleration starting position and a reference-point position. Reference-point return velocity is reduced using the signal indicating the deceleration starting position, and movement of the movable machine element is stopped in response to the signal indicative of the reference-point position. Return to the reference point is thus achieved.

DESCRIPTION OF THE PREFERRED EMBODIMENT

Figure 1:
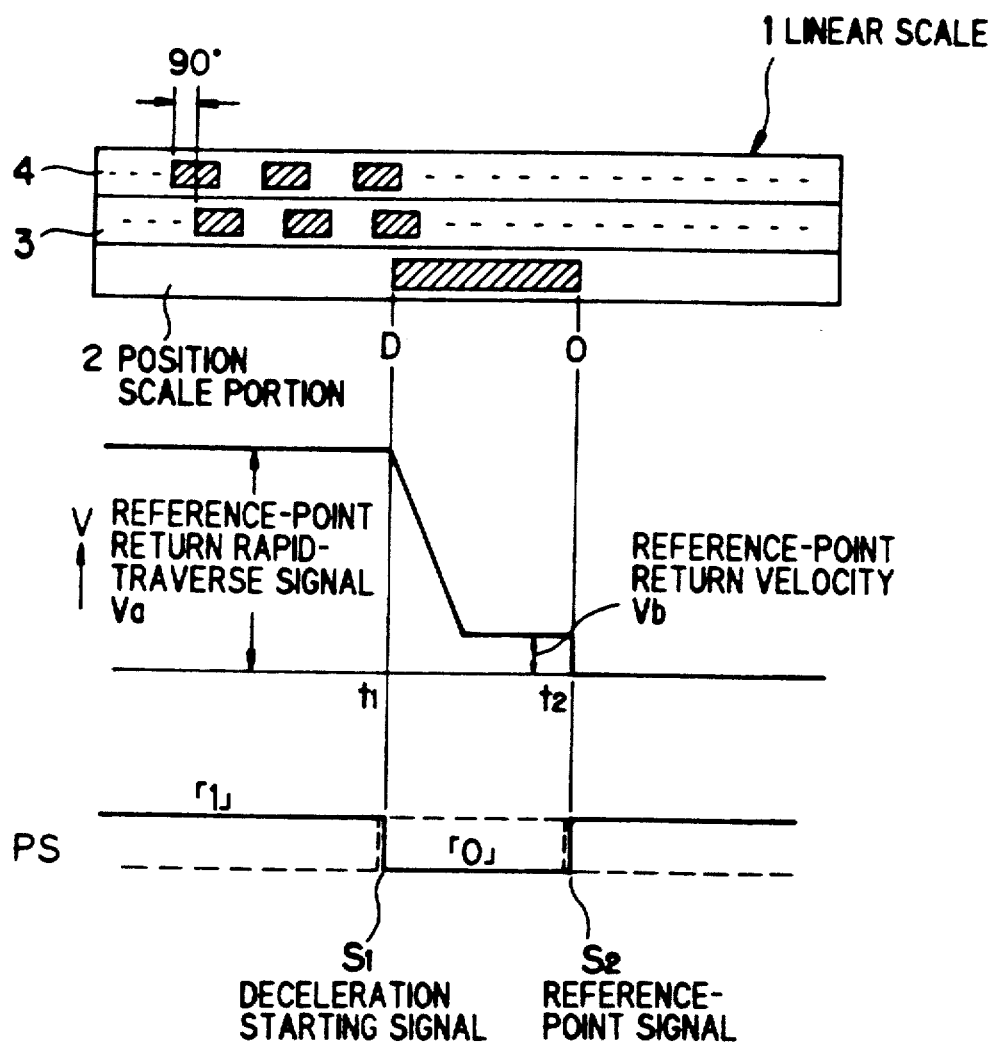
FIG. 1 is a view for describing the general features of the present invention.
Figure 2:
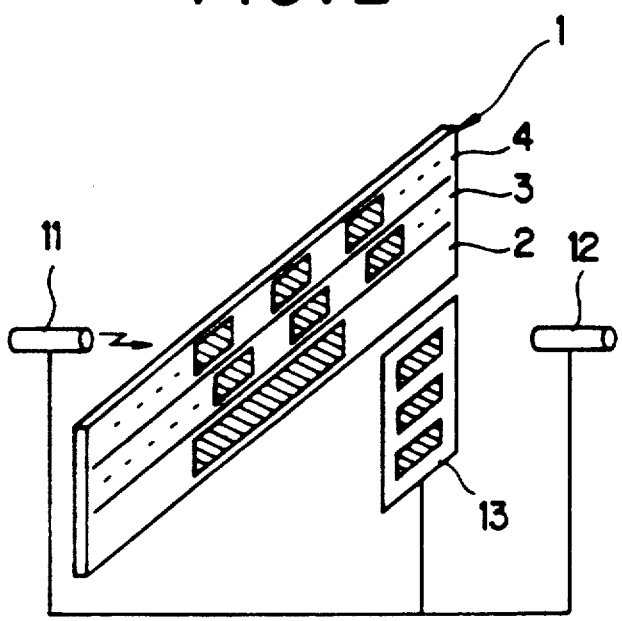
FIG. 2 is a perspective view of the operating principle and shows the construction of a linear scale.

FIG. 1 is a view for describing the general features of the present invention, and FIG. 2 is a perspective view showing the construction of a linear scale.

With reference to the drawings, numeral 1 denotes a linear scale having a position scale portion 2 for stipulating an acceleration starting position and a reference-point position, and position measurement portions 3, 4 which generate A-phase and B-phase signals for detecting position. Va represents a rapid-traverse velocity for return to a reference point, Vb a velocity for return to the reference point, $S_1$ a deceleration-start signal, and $S_2$ a reference-point position signal.

Figure 5:
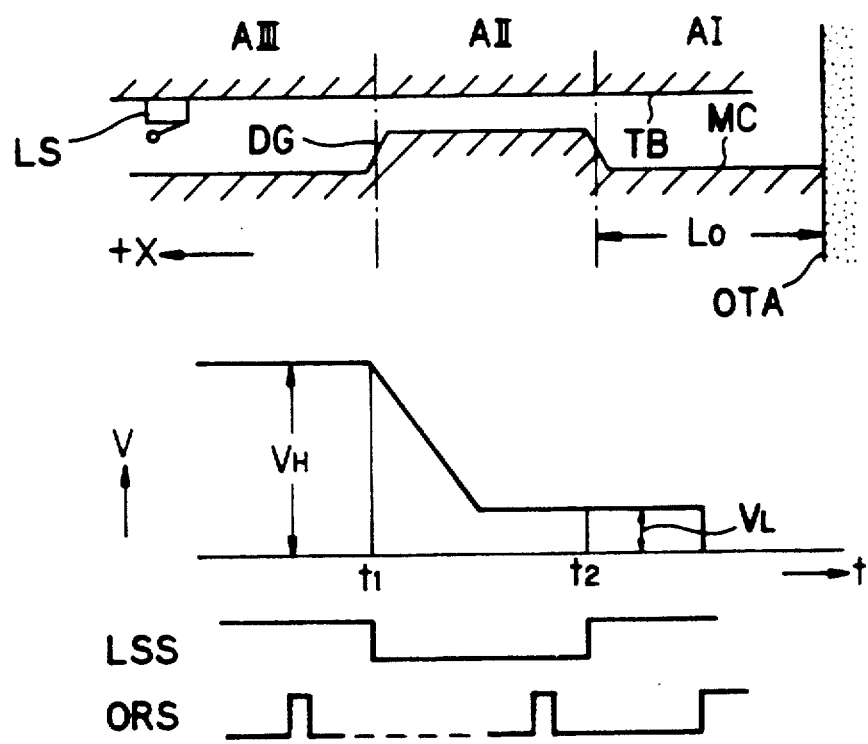
FIG. 5 is a view for describing the reference-point return method according to the prior art.

The linear scale 1 comprises a glass-like transparent plate, and masks (the shaded portions in the drawings) for blocking the transmission of light through the glass-like transparent plate. A deceleration starting position D and a reference-point position O are set at respective ends of the mask of the position scale 2. The two-phase signals A, B for measuring the position of the movable machine element TB shown in FIG. 5 are generated by virtue of the mask patterns of the position measurement scale portions 3 and 4. The two-phase signals A and B are 90° out of phase.

FIG. 2 is a perspective view of the operating principle and shows the construction of a linear scale. A light-emitting element 11 and a light-receiving element 12 are arranged to oppose each other with the linear scale 1 and a scale 13 on the light-receiving side disposed therebetween. These are arranged to detect the transmission of light through the linear scale. The signals $S_1$, $S_2$ indicative of the deceleration starting position D and reference-point position O are generated by light which has passed through the position scale portion 2. Though only one light-emitting element and only one light-receiving element are shown, in actuality these are provided for each of the scale portions 2 through 4 and they are so arranged that the transmitted light beams will not interfere with one another. The linear scale 1 is secured to the stationary portion MC of the machine shown in FIG. 5, and the light-emitting element 11, light-receiving element 12 and scale 13 on the light-receiving side are provided on the movable element TB of the machine to move in unison therewith.

Figure 3:
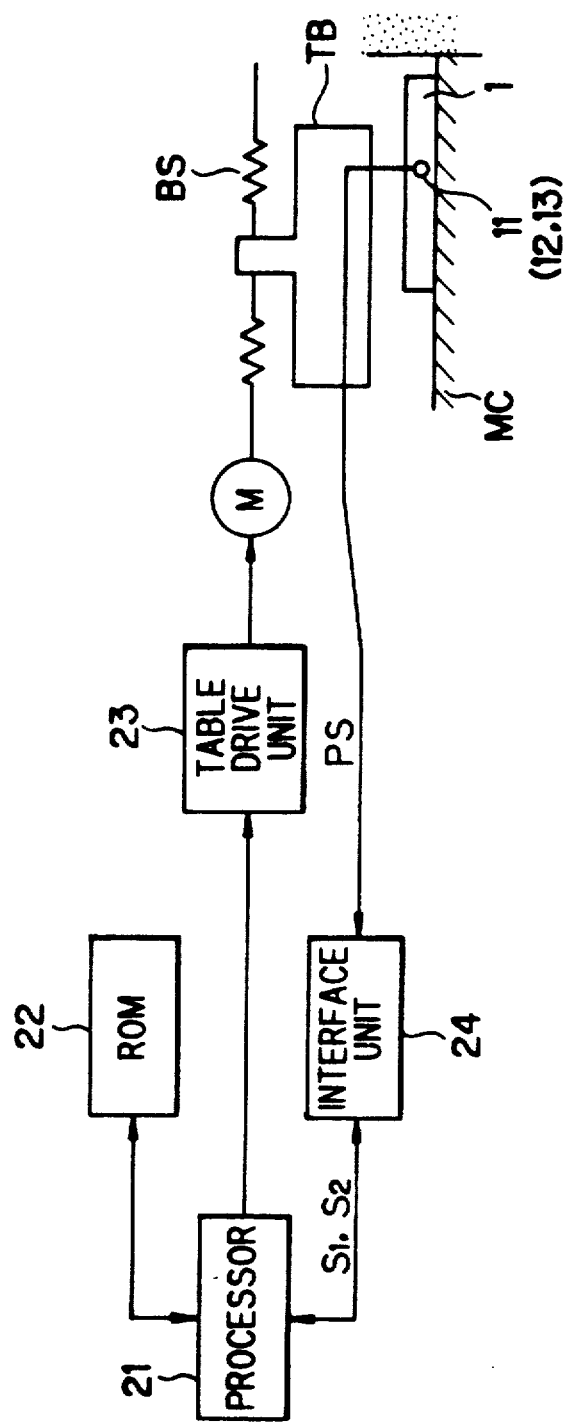
FIG. 3 is a control block diagram of a machine tool capable of practicing the reference-point return method of the present invention.

FIG. 3 is a control block of a machine tool capable of practicing the reference-point return method of the present invention.

Numeral 21 denotes a processor which exercises overall control, 22 a ROM storing a reference-point return control program according to the present invention, and 23 a table drive unit for rotating the motor M to drive the movable machine element TB via a ball screw BS coupled to the rotary shaft of the motor M. Numeral 24 denotes an interface unit for inputting the deceleration starting signal $S_1$ and reference-point position signal $S_2$ to the processor 21 using a position signal PS obtained from the light-emitting element 11 and light-receiving element 12, by way of example. The processor 21 performs control to effect return to the reference point by slowing the reference-point rapid-traverse velocity Va to the reference-point return velocity Vb using the deceleration starting signal $S_1$, and stopping the movable element by the reference-point position signal $S_2$.

Figure 4:
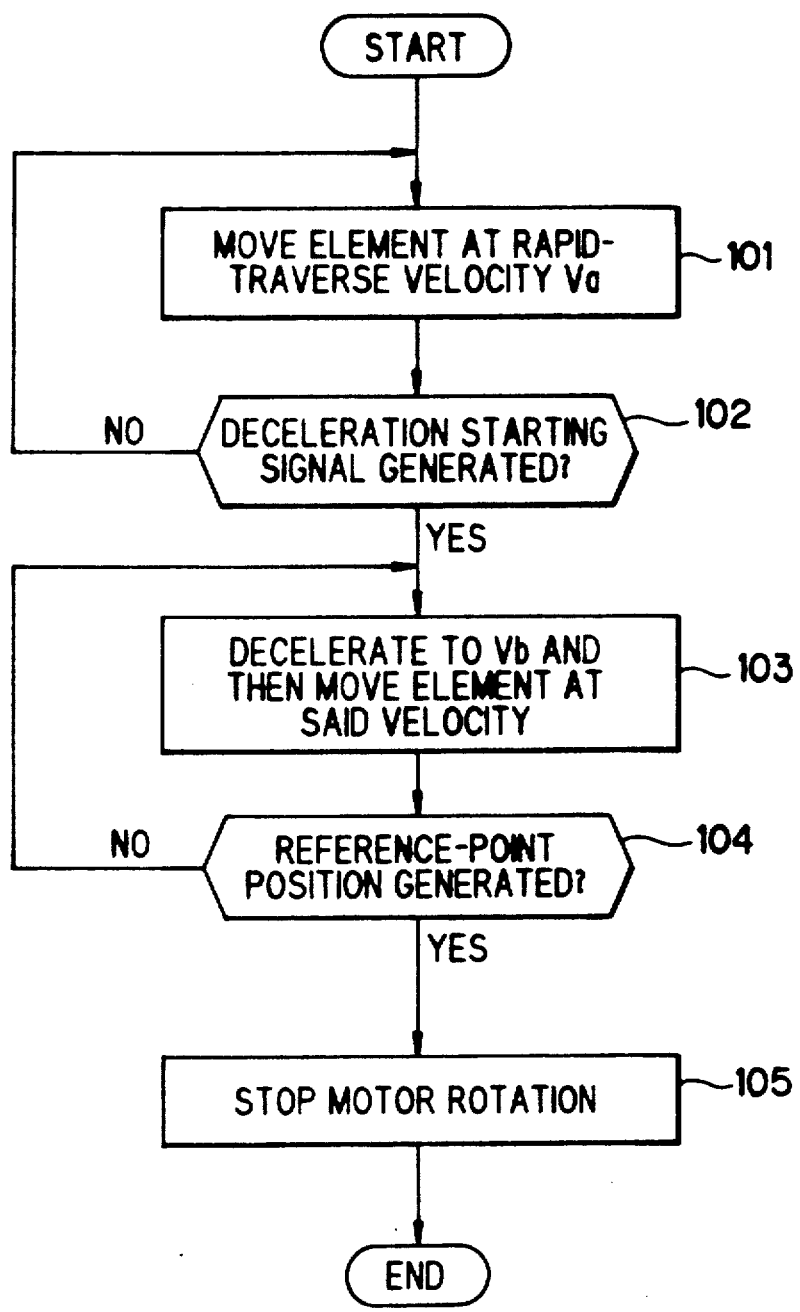
FIG. 4 is a flowchart of processing according to the present invention.

FIG. 4 is a flowchart of reference-point return processing according to the present invention. Reference-point return control of the present invention will now be described with reference to FIGS. 1 through 4.

First, when a button on an operator's panel, not shown, is manipulated to command a reference-point return mode, the processor 21 is placed under the control of the reference-point return control program stored in the ROM 22 and executes reference-point return control, described below. Specifically, the processor 21 causes the movable machine element TB to move toward the reference point at the reference-point rapid-traverse velocity Va (step 101). When the vicinity of the reference point is reached at time $t_1$, the position PS outputted by the linear scale 1 makes a transition from "1" (high level) to "0" (low level), as shown in FIG. 1. In response to this negative-going transition of the position signal, the interface unit 24 generates the deceleration starting signal $S_1$ (step 102). The processor 21 responds to the deceleration starting signal $S_1$ by slowing the traveling velocity to the reference-point return velocity Vb (step 103). The position signal PS outputted by the linear scale 1 reverts from "0" to "1" at time $t_2$. When the position signal makes this transition from "0" to "1" (i.e., when the signal rises), the interface unit 24 generates the reference-point position signal $S_2$ (step 104). As a result, the processor 21 recognizes the position at which the reference point position signal was generated as being the reference-point position, stops the rotation of the motor M and ends reference-point return control (step 105).

It should be noted that the position signal PS outputted by the linear scale 1 can be replaced by one obtained by inverting this signal level, as indicated by the dashed line. The reference-point position can be shifted if this arrangement is adopted.

Further, it is possible to set a numerical value N in advance, generate the reference-point position signal $S_2$ and subsequently stop the movable machine element, with the position at which N-number of the two-phase signals have been generated following generation of the signal $S_2$ being taken as the reference point.

Thus, in accordance with the present invention, the arrangement is such that a linear scale generates signals indicative of a deceleration starting position and a reference-point position, reference-point return velocity is slowed using the signal indicating the deceleration starting position, and movement is stopped in response to the signal indicative of the reference-point position, thereby achieving return to the reference point. As a result, reference-point return can be performed in highly accurate fashion without using a mechanical switch.

We claim:

1. A reference-point return method for returning a movable element of a machine to a reference point using a linear scale having a first scale portion and a second scale portion comprising the steps of:
    (a) obtaining a deceleration starting position using the second scale portion;
    (b) obtaining a reference-point position using the second scale portion;
    (c) generating signals indicative of the deceleration starting position and the reference-point position using the second scale portion of said linear scale;
    (d) slowing return velocity using the deceleration starting signal; and
    (e) returning the movable element to the reference point by stopping movement of the movable element in response to the reference-point position signal.

2. A reference-point return method according to claim 1, wherein said linear scale includes a glass-like transparent plate having masks, and wherein step (c) includes the sub-step of:
    blocking transmission of light by using the masks on the glass-like transparent glass.

3. A reference-point return method according to claim 2, further comprising the step of:
    producing the masks on the glass-like transparent plate so as to vary the light transmission at the deceleration starting position and at the reference-point position.

4. A reference-point return method according to claim 1, further comprising the steps of:
    (f) generating two phase signals from the first scale portion; and
    (g) stopping movement of the movable element when a predetermined number of the two-phase signals have been generated after generated of the reference-point position signal.

* * * * *